United States Patent
Nagai (10) Patent No.: US 7,366,543 B2
(45) Date of Patent: Apr. 29, 2008

(54) METHOD FOR ALLOCATING CHANNELS, AND BASE STATION APPARATUS AND COMMUNICATION SYSTEM UTILIZING THE CHANNEL ALLOCATING METHOD

(75) Inventor: Makoto Nagai, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 216 days.

(21) Appl. No.: 10/808,526

(22) Filed: Mar. 25, 2004

(65) Prior Publication Data

US 2004/0192391 A1   Sep. 30, 2004

(30) Foreign Application Priority Data

Mar. 25, 2003   (JP)   ............... 2003-083810

(51) Int. Cl.
H04B 1/38   (2006.01)
H04Q 7/20   (2006.01)

(52) U.S. Cl. ................... 455/561; 455/450

(58) Field of Classification Search .......... 455/403, 455/450–453, 455, 456.5, 456.6, 561, 418–420, 455/424, 434, 509, 516–517, 68; 370/229, 370/341, 232, 329
See application file for complete search history.

(56) References Cited

U.S. PATENT DOCUMENTS

| | | | |
|---|---|---|---|
| 6,181,947 B1 * | 1/2001 | Du et al. ............... | 455/509 |
| 2002/0142732 A1 * | 10/2002 | Asano ................ | 455/73 |
| 2003/0083104 A1 * | 5/2003 | Lohman et al. ....... | 455/562 |
| 2003/0142658 A1 * | 7/2003 | Ofuji et al. .......... | 370/349 |
| 2003/0203736 A1 * | 10/2003 | Chi et al. ............ | 455/450 |
| 2004/0180695 A1 * | 9/2004 | Sano ................. | 455/561 |

FOREIGN PATENT DOCUMENTS

| | | |
|---|---|---|
| EP | 1 193 993 A2 | 4/2002 |
| JP | 2002-374321 A | 12/2002 |

OTHER PUBLICATIONS

Chinese Office Action issued in Chinese Patent Application No. CN 200410008576.9 dated Oct. 21, 2005.
Taiwanese Office Action issued in Taiwanese Patent Application No. 93106431 dated May 1, 2007.

* cited by examiner

Primary Examiner—George Eng
Assistant Examiner—Nam Huynh
(74) Attorney, Agent, or Firm—McDermott Will & Emery LLP

(57) ABSTRACT

A demodulator performs a demodulation processing on received signals. A quality detector detects the line quality of a communication line. An application detector detects application information set within the received signal. A storage is a storage medium that stores various pieces of information. A usage rate detector detects a current channel usage rate from a usage rate information unit in the storage. A modulation method and channels determining unit determines a modulation method and the number of channels to be allocated to a terminal apparatus which is a targeted communication party. An instruction unit 64 carries out the scheduling of a plurality of terminal apparatuses based on the modulation method and the number of channels, and sets, within a message to be sent to the terminal apparatus, the information on the determined modulation method and the number of channels. A network interface unit is an interface with a network.

5 Claims, 8 Drawing Sheets

| MODULATION METHOD | 1 CHANNEL USED | 2 CHANNELS USED | 3 CHANNELS USED | 4 CHANNELS USED |
|---|---|---|---|---|
| BPSK | 16Kbps | 32Kbps | 48Kbps | 64Kbps |
| $\pi/4$ SHIFT QPSK | 32Kbps | 64Kbps | 96Kbps | 128Kbps |
| 16QAM | 64Kbps | 128Kbps | 192Kbps | 256Kbps |

| MODULATION METHOD | 1 CHANNEL USED | 2 CHANNELS USED | 3 CHANNELS USED | 4 CHANNELS USED |
|---|---|---|---|---|
| BPSK | 16Kbps | 32Kbps | 48Kbps | 64Kbps |
| $\pi/4$ SHIFT QPSK | 32Kbps | 64Kbps | 96Kbps | 128Kbps |
| 16QAM | 64Kbps | 128Kbps | 192Kbps | 256Kbps |

METHOD FOR ALLOCATING CHANNELS, AND BASE STATION APPARATUS AND COMMUNICATION SYSTEM UTILIZING THE CHANNEL ALLOCATING METHOD

BACKGROUND OF THE INVENTION

1. Field of the Invention

The present invention relates to the channel allocating technologies, and the base station technologies and communications technologies utilizing the channel allocating technologies. The present invention particularly relates to a channel allocating method according to the type of application used in a terminal, and a base station apparatus and its communication system utilizing the channel allocating method.

2. Description of the Related Art

Various types of non-voice Communications such as the transmission of images are in practice owing to the growing multimedia services. The amount of information in this non-voice communication varies, but there is a basic demand where the variation in the transmission time be minimized. For example, if the reproduction of the moving image streaming is to be carried out in the non-voice communication, the amount of information in the moving image data varies according to the variation of the images, so that it is desirable that the variation in the transmission time be minimized in order for the images to be smoothly reproduced at a receiving end. In addition to the transmission time, it is also required that a predetermined transmission quality, namely, the so-called communication quality be satisfied.

As an approach for meeting the above-described requirements, there is available a method in which the transmission speed between a base station apparatus and a terminal apparatus is determined according to the amount of information to be transmitted, namely, the size of a packet. That is, the transmission rate is raised as the packet size becomes large whereas it is reduced as the packet size becomes small. Thereby, the variation of transmission time between the base station apparatus and the terminal apparatus is kept small. Reference (1) in the following Related Art List serves as an example for such a conventional method.

Related Art List (1) Japanese Patent Application Laid-Open No. 2002-374321.

In a case where the information to be handled by the non-voice communication is the moving image streaming, desired is the smaller variation in the transmission rate. In the case of video conference, it is further requested that the transmission time itself be generally small. On the other hand, if the information to be handled by the communication is data for file transfer or Web browser, the accuracy of transmitted data is most critically required rather than the transmission time. In this manner, the requirements for the communication quality differ according to application used in the terminal apparatus. In general, the base station apparatus connects a plurality of terminal apparatuses by multiplexing, and communicates with them by allocating predetermined channels to the respective terminal apparatuses. Thus, the limited wireless resources are used among the plurality of terminal apparatuses. In such a situation, when many wireless resources are used in order to reduce the transmission time while a predetermined terminal apparatus is performing the file transfer, the streaming reproduction by other terminal apparatus may not be performed in a desired manner. Moreover, if a communication means between the base station apparatus and the terminal apparatus is wireless communication, it is possible that the characteristics of propagation paths may have an adverse effect on the communication.

SUMMARY OF THE INVENTION

The present invention has been made in recognition of the foregoing circumstances and an object thereof is to provide a method for allocating channels to a plurality of terminals multiplexed by a base station apparatus, and provide a base station apparatus and a communication system utilizing said channel allocating method. Another object thereof is to provide a channel allocating method in consideration of the types of application used, and a base station apparatus and a communication system utilizing said channel allocating method. Still another object thereof is to provide a method for allocating channels according to the current usage status of channels, and a base station apparatus and a communication system utilizing said channel allocating method.

A preferred embodiment according to the present invention relates to a base station apparatus. This apparatus includes: a receiver which receives signals from a terminal apparatus which is a targeted communication party; a permissible delay time detector which detects, from the signals received by the receiver, permissible delay time in data communication corresponding to an application used in the terminal apparatus; a decision unit which determines a transmission rate per channel and the number of channels to be allocated to the terminal apparatus, in a communication line that contains a plurality of channels, according to the permissible delay time detected by the detector; and an instruction unit which instructs the terminal apparatus to perform communication of data corresponding to the application by using the communication rate per channel and the number of channels determined by the decision unit.

The "permissible delay time" is the allowable delay time but it is not limited to the time only, and may be other information associated with the delay time. For example, information may be that the application requires the real-timeness.

By implementing the above structure, the transmission rate per channel and the number of channels are determined based on the permissible delay time, so that the communication suitable for the application can be carried out.

Another preferred embodiment according to the present invention relates also to a base station apparatus. This apparatus includes: a receiver which receives signals from a terminal apparatus which is a targeted communication party; a permissible delay time detector which detects, from the signals received by the receiver, permissible delay time in data communication corresponding to an application used in the terminal apparatus; a quality detector which derives from the received signals a value indicative of the quality of a communication line; a decision unit which determines a transmission rate per channel and the number of channels to be allocated to the terminal apparatus, according to the permissible delay time detected by the detector, the value indicative of the quality of a communication line and a current channel usage rate in the communication line containing a plurality of channels; and an instruction unit which instructs the terminal apparatus to perform communication of data corresponding to the application by using the communication rate per channel and the number of channels determined by the decision unit.

The decision unit may so determine that the transmission rate per channel is raised and the number of channels is reduced according to the derived value indicative of the quality of a communication line if the detected permissible delay time is greater than a predetermined threshold value and that the transmission rate per channel is lowered and the number of channels is increased according to the channel usage rate if the detected permissible delay time is less than or equal to the predetermined threshold value.

By employing the above apparatus, the transmission rate per channel and the number of channels are determined based on the quality of the communication line and the channel usage rate in addition to the permissible delay time. Thus, the communication suitable for the application can be carried out within the limited wireless resources.

Still another preferred embodiment according to the present invention relates to a communication system. This system includes: a terminal apparatus which uses a predetermined application; and a base station apparatus which communicates with the terminal apparatus via a communication line containing a plurality of channels. In this system, the terminal apparatus transmits information on permissible delay time in data communication corresponding to the predetermined application to be used, and the base station apparatus detects quality of the communication line and a channel usage rate and determines a transmission rate per channel and the number of channels to be allocated to the terminal apparatus based on the information on permissible delay time received from the terminal apparatus together with the quality of the communication line and channel usage rate detected.

By employing the above system, the application in the terminal apparatus can be executed without any problem and further many terminal apparatuses can be multiplexed.

Still another preferred embodiment according to the present invention relates to a channel allocating method. This method is such that, based on permissible delay time in data communication corresponding to an application used in a terminal apparatus which is a targeted communication party, a transmission rate per channel and the number of channels to be allocated to the terminal apparatus are determined for a plurality of channels contained in a communication line connected with the terminal apparatus.

Still another preferred embodiment according to the present invention relates also to a channel allocating method. This method includes: receiving signals from a terminal apparatus which is a targeted communication party; detecting, from the signals received by the receiving, permissible delay time in data communication corresponding to an application used in the terminal apparatus; determining a transmission rate per channel and the number of channels to be allocated to the terminal apparatus, in a communication line that contains a plurality of channels, according to the permissible delay time detected by the detecting; and instructing the terminal apparatus to perform communication of data corresponding to the application by using the communication rate per channel and the number of channels determined by the determining.

Still another preferred embodiment according to the present invention relates also to a channel allocating method. This method includes: receiving signals from a terminal apparatus which is a targeted communication party; detecting, from the signals received by the receiving, permissible delay time in data communication corresponding to an application used in the terminal apparatus; deriving from the received signals a value indicative of the quality of a communication line; determining a transmission rate per channel and the number of channels to be allocated to the terminal apparatus according to the permissible delay time detected by the detecting, the derived value indicative of the quality of a communication line and a current channel usage rate in the communication line containing a plurality of channels; and instructing the terminal apparatus to perform communication of data corresponding to the application by using the communication rate per channel and the number of channels determined by the determining.

The determining a transmission rate per channel and the number of channels may be such that the transmission rate per channel is raised and the number of channels is reduced according to the derived value indicative of the quality of a communication line if the detected permissible delay time is greater than a predetermined threshold value and that the transmission rate per channel is lowered and the number of channels is increased according to the channel usage rate if the detected permissible delay time is less than or equal to the predetermined threshold value.

Still another preferred embodiment according to the present invention relates to a program. This program includes the functions of receiving signals from a terminal apparatus which is a targeted communication party; detecting, from the signals received by the receiving, permissible delay time in data communication corresponding to an application used in the terminal apparatus; determining a transmission rate per channel and the number of channels to be allocated to the terminal apparatus, in a communication line that contains a plurality of channels, according to the permissible delay time detected by the detecting; and instructing the terminal apparatus to perform communication of data corresponding to the application by using the communication rate per channel and the number of channels determined by the determining.

Still another preferred embodiment according to the present invention relates also to a program. This program includes the functions of: receiving signals from a terminal apparatus which is a targeted communication party; detecting, from the signals received by the receiving, permissible delay time in data communication corresponding to an application used in the terminal apparatus; deriving from the received signals a value indicative of the quality of a communication line; determining a transmission rate per channel and the number of channels to be allocated to the terminal apparatus according to the permissible delay time detected by the detecting, the derived value indicative of the quality of a communication line and a current channel usage rate in the communication line containing a plurality of channels; and instructing the terminal apparatus to perform communication of data corresponding to the application by using the communication rate per channel and the number of channels determined by the determining.

In the program, the determining a transmission rate per channel and the number of channels may be such that the transmission rate per channel is raised and the number of channels is reduced according to the derived value indicative of the quality of a communication line if the detected permissible delay time is greater than a predetermined threshold value and that the transmission rate per channel is lowered and the number of channels is increased according to the channel usage rate if the detected permissible delay time is less than or equal to the predetermined threshold value.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

The present embodiment relates to a base station apparatus capable of accessing a plurality of terminal apparatuses. A frame generated by the base station apparatus contains a plurality of channels and each of the channels is allocated to a predetermined terminal apparatus. The transmission rate per channel, namely, a modulation method adopted in the base station apparatus and the terminal apparatus, is set in such a manner that it can be varied. On the other hand, a predetermined application is being used in a PC connected to the terminal apparatus, and the terminal apparatus notifies the base station apparatus about permissible delay time of data communicated for the application. The base station apparatus according to the present embodiment determines a modulation method and the number of channels for the terminal apparatus, according to the thus notified permissible delay time, and then allocates the thus determined channels to the terminal apparatus. That is, in a case when the permissible delay time set for the data in the application is small, a modulation method, such as BPSK (Binary Phase Shift Keying), which is rather robust against the error, is adopted in a video conference system, for instance, so that the large number of channels is allocated and the retransmission of data is reduced. In a case when the permissible delay time set for the data in the application is large, a modulation method, such as 16QAM, which can transmit a large amount of data is adopted in a file transfer, for instance, so that the small number of channels is allocated and other terminal apparatuses can be connected to the base station apparatus.

In the wireless communication between base station apparatus and terminal apparatuses, the characteristics of a transmission path affects the decision-making of a modulation type, and in the base station that are being connected with a plurality of terminal apparatuses the number of channels which has been already allocated affects the decision-making of the number of channels to be allotted. Thus, the base station apparatus according to present embodiment detects communication quality and channel usage rate, in addition to the above-described permissible delay time, and takes all of these into consideration.

Figure 1:
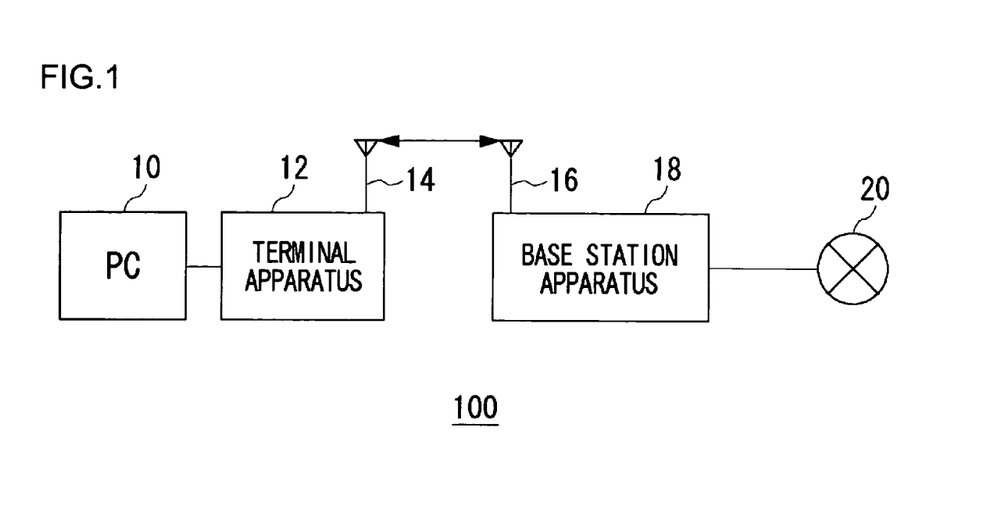
FIG. 1 shows a communication system according to the present embodiment.

FIG. 1 shows a communication system 100 according to the present embodiment. The communication system 100 includes a PC 10, a terminal apparatus 12, a terminal antenna 14, a basestation antenna 16, and a base station apparatus 18 and a network 20.

The PC 10 executes a predetermined application in accordance with an instruction from a user. The application includes a video conference system, moving image reproduction, file transfer, Web browser and so forth.

The terminal apparatus 12 is a radio unit connected to the PC 10, and further includes a terminal antenna 14 and is connected to a base station apparatus 18 (described later) with which the data necessary for the application of the PC 10 is communicated. Though a single terminal apparatus 12 only is shown in FIG. 1, a plurality of PCs 10 may be included in the communication system 100.

The base station apparatus 18 is a radio unit which can communicate with a plurality of terminal apparatuses by allocating predetermined channels to the respective terminal apparatuses 12. Further, the base station apparatus 18 has a basestation antenna 16 by which to access and get connected with the terminal apparatuses 12.

Figure 2:
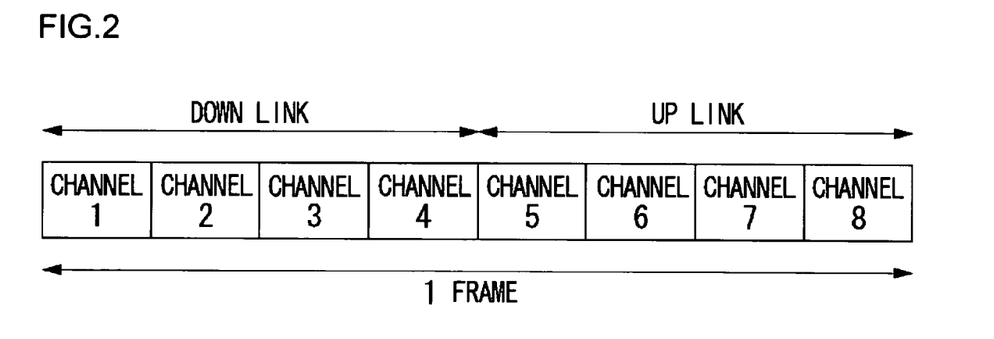
FIG. 2 shows a frame format according to the present embodiment.

FIG. 2 shows a frame format according to the present embodiment. The frame format shown in FIG. 2 is the same as one for a personal handyphone system (PHS); a single frame is constituted by eight channels. Among the eight channels, the four channels are used for the down link whereas the remaining four channels are used for the up link. The modulation method for a channel is set separately from other channels. Hereinafter, it is assumed for the brevity that the modulation method to be set is any one of BPSK (Binary Phase Shift Keying), π/4 shift QPSK (Quadrature Phase Shift Keying) and 16QAM (16 Quadrature Amplitude Modulation).

Figure 3:
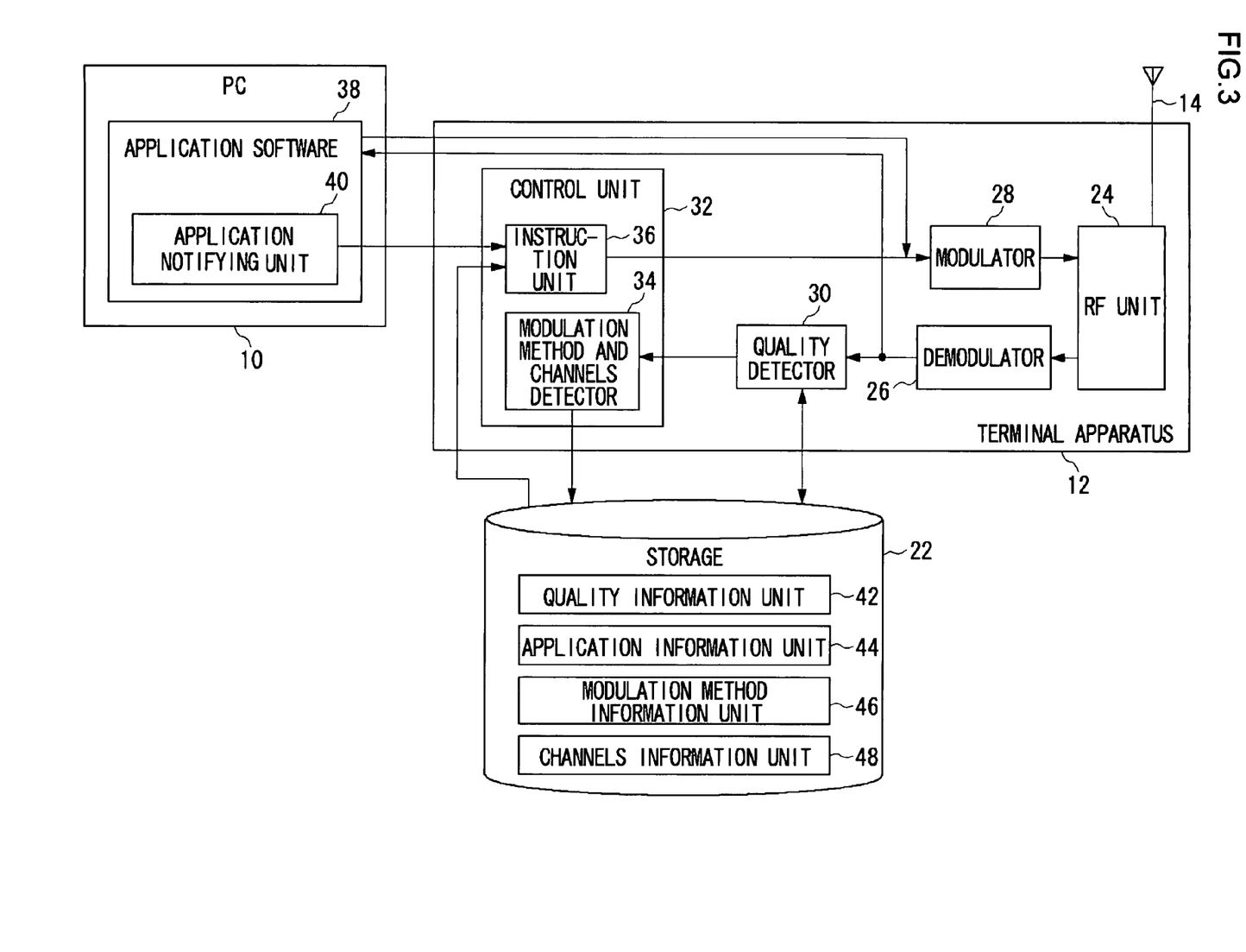
FIG. 3 shows a structure of the terminal apparatus shown in FIG. 1.

FIG. 3 shows a structure of the terminal apparatus 12. The terminal apparatus 12 includes a storage 22, an RF unit 24, a demodulator 26, a modulator 28, a quality detector 30 and a control unit 32. The control unit includes 32 a modulation method and channels detector 34 and an instruction unit 36. The storage 22 includes a quality information unit 42, an application information unit 44, a modulation method information unit 46 and a channels information unit 48. The PC 10 includes application software 38, and the application software 38 includes an application notifying unit 40.

The RF unit 24 performs a processing between a baseband signal and a radio frequency signal which are processed by the modulator 28 or demodulator 26 (described later). Here, the processing includes a frequency conversion, an amplification processing, an A-D or D-A conversion and so forth.

The demodulator 26 performs a demodulation processing on a received signal which has been converted to a baseband by the RF unit 24. It is assumed here that the demodulation processing also changes according to the modulation method adopted for the received signal. For example, the modulated signal is coherent-detected in the 16QAM whereas it is differential-detected in the π/4 shift QPSK. Moreover, it is assumed here that the demodulator 26 further includes a carrier synchronous circuit and an AFC (Automatic Frequency Control) unit necessary for the synchronous detection.

The quality detector 30 measures the line quality of a telecommunication line or communication network. The line quality may be arbitrary, and it may be, for example, a received power, a ratio of desired wave power over interference power, a delay spread, a bit error rate (BER) and so forth. Moreover, the quality detector 30 gathers information on the measured line quality and stores the information in the quality information unit 42 (described later) of the storage 22. It is to be noted that the quality detector 30 will not be necessary if the line quality of the up link only is measured and the line quality of the down link is assume equivalent to that of the up link.

The modulation method and channels detector 34 detects a modulation method and channel usage information set within a message contained in the received signals from the base station apparatus 18, and stores them in the modulation method information unit 46 (described later) and the channels information unit 48 (described later) of the storage 22, respectively.

The application software 38 is software run on the PC, and is located on upper-layer protocol in the terminal apparatus 12.

The application notifying unit 40 is contained in the application software 38. The application notifying unit 40 notifies the control unit 32, which controls a lower layer protocol of the application software 38, of application information. The application information contains information on the permissible delay time. The information includes information on the permissible delay time itself, software classification information corresponding to the permissible delay time and so forth. As examples of the software classification information, there are type 1 in which the permissible delay time is small and type 2 in which the permissible delay time is large.

The storage 22 is a storage medium which stores various information, and is comprised of a quality information unit 42, an application information unit 44, a modulation method information unit 46 and a channels information unit 48. The quality information unit 42 stores information on the line quality measured by the quality detector 30. The application information unit 44 stores application information notified from the application notifying unit 40. The modulation method information unit 46 and the channels information unit 48 store the modulation method and the channel usage information detected by the modulation method and channels detector 34, respectively. It is to be noted that the storage 22 may be provided inside the terminal apparatus 12.

The instruction unit 36 sets, within a message to be sent to the base station apparatus 18, the application information notified from the application notifying unit 40 and the information on the line quality measured by the quality detector 30.

The modulator 28 performs a modulation processing on the message set by the instruction unit 36 and the data of application software 38. As the information on the modulation method and the number of channels to be used for the modulation processing, used is the information stored in the modulation method information unit 46 and the channels information unit 48, respectively.

In addition to the above-described operations, the control unit 32 analyzes the received demodulation data and operates according to the analyzed result and carries out the operations of establishing a connection, controlling the timing thereof and so forth.

In terms of hardware, the above-described structure can be realized by a CPU, a memory and other LSIs of an arbitrary computer. In terms of software, it can be realized by memory-loaded programs which have managing and scheduling functions or the like, but drawn and described here are function blocks that are realized in cooperation with those. Thus, it is understood by those skilled in the art that these function blocks can be realized in a variety of forms by hardware only, software only or the combination thereof.

Figure 4:
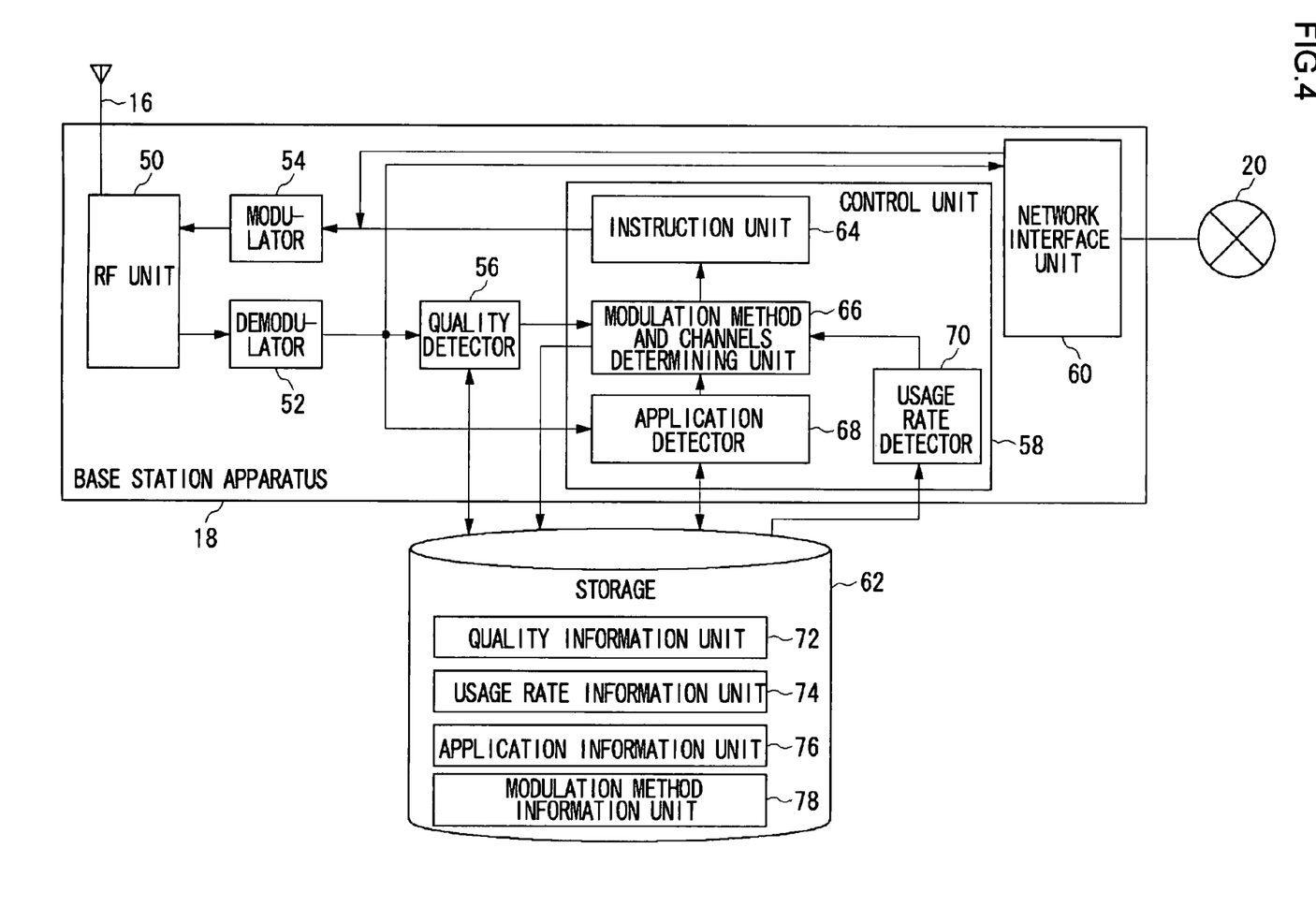
FIG. 4 shows a structure of the base station apparatus shown in FIG. 1.

FIG. 4 shows a structure of a base station apparatus 18. The base station apparatus 18 includes an RF unit 50, a demodulator 52, a modulator 54 and a quality detector 56, a control unit 58, a network interface unit 60, and a storage 62. The control unit 58 includes an instruction unit 64, a modulation method and channels determining unit 66, an application detector 68 and a usage rate detector 70. The storage 62 includes a quality information unit 72, a usage rate information unit 74, an application information unit 76 and a modulation method information unit 78.

The RF unit 50 performs a processing between a baseband signal and a radio frequency signal which are processed by the modulator 54 or demodulator 52 (described later). Here, the processing includes a frequency conversion, an amplification processing, an A-D or D-A conversion and so forth.

The demodulator 52 performs a demodulation processing on a received signal which has been converted to a baseband by the RF unit 50. It is assumed here that, similar to the demodulator 26 described above, the demodulation processing is also changed according to the modulation method adopted for the received signal.

The quality detector 56 detects the line quality of a communication network, and measures the line quality of a down link by detecting information on the line quality set in a message within a received signal from the terminal apparatus 12. As for the line quality of an up link, measured by an arbitrary means are, for example, a received power, a ratio of desired wave power over interference power, a delay spread, a bit error rate (BER) and so forth. Moreover, the quality detector 56 gathers information on the measured line qualities and stores the information in the quality information unit 72 (described later) of the storage 62. It is to be noted that only one of the above processing is carried out if it suffices to measure either the line quality on up link or down link.

The application detector 68 detects application information set in a message within received signals from the terminal apparatus 12. Moreover, the application detector 68 stores the thus detected application information in the application information unit 76 (described later) of the storage 62.

The storage 62 is a storage medium which stores various information, and is comprised of a quality information unit 72, a usage rate information unit 74, an application information unit 76 and a modulation method information unit 78. The quality information unit 72 stores information on the line quality detected by the quality detector 56. The application information unit 76 stores application information notified from the application detector 68. The usage rate information unit 74 and the modulation method information unit 78 store the usage information and the modulation method which are scheduled by the control unit 58, respectively. It is to be noted that the storage 62 may be provided inside the base station apparatus 18.

The usage rate detector 70 detects the current channel usage rate from the usage rate information unit 74 in the storage 62. The channel usage rate may be the number of channels being currently in use.

Based on the application information notified from the application detector 68 and the information on the detected line quality notified from the quality detector 56 and the channel usage rate notified from the usage rate detector 70, the modulation method and channels determining unit 66 determines both the modulation method and the number of channels to be allocated to a communicating party. The details of how to determine them will be described later.

The instruction unit 64 carries out the scheduling of a plurality of terminal apparatuses 12 based on the modulation method and the number of channels determined by the modulation method and channels determining unit 66. Moreover, the instruction unit 64 sets, within a message to be sent to the terminal apparatus 12, the information on the determined modulation method and the number of channels.

The network interface unit 60 is an interface with a network 20.

In addition to the above-described operations, the control unit 58 analyzes the received demodulation data and operates according to the analyzed result and carries out the operations of establishing a connection, controlling the timing thereof and so forth.

Figure 5:
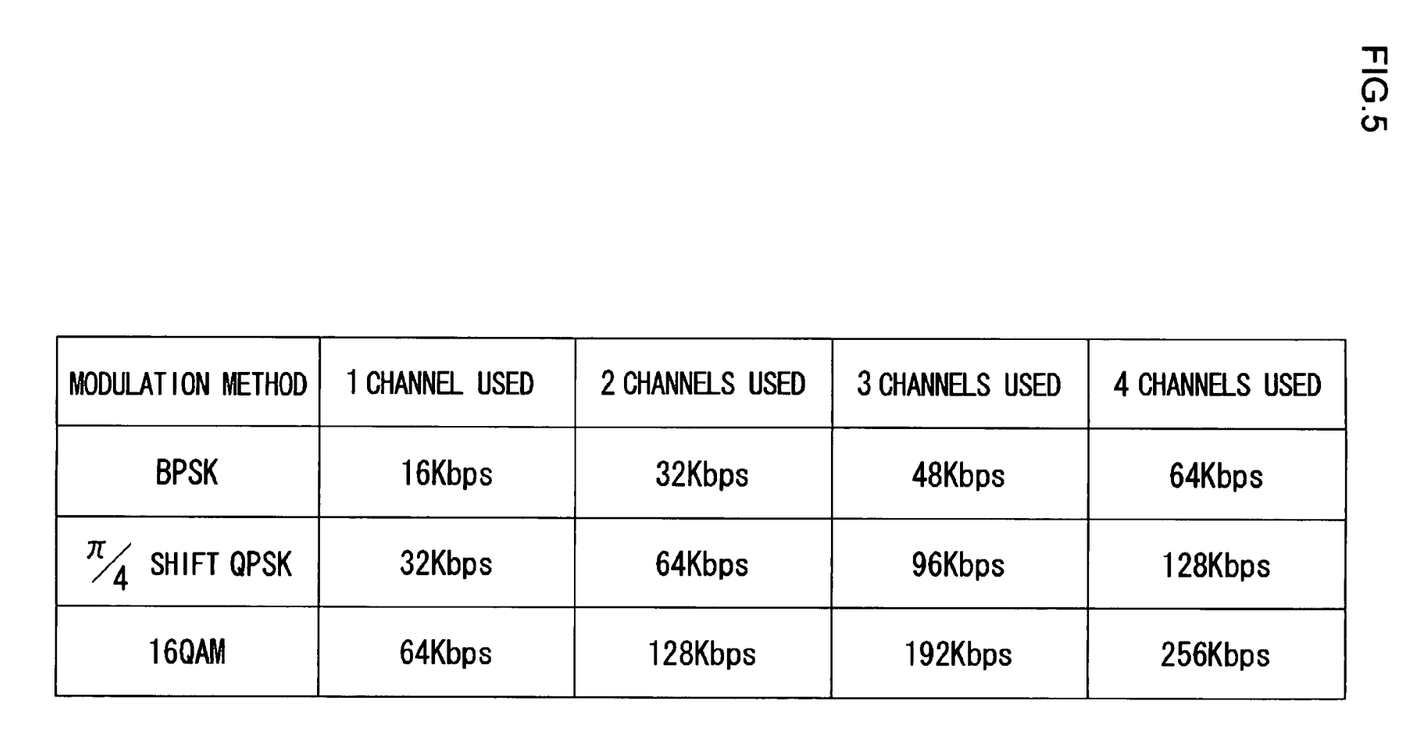
FIG. 5 shows relationships between a modulation method and a transmission rate for the number of channels in use.

FIG. 5 shows relationships between a modulation method and a transmission rate for the number of channels in use. As was mentioned above, the modulation method used here is among BPSK, $\pi/4$ shift QPSK and 16QAM, so that there are shown the transmission rates realized when the number of channels used is varied according to the modulation method. For example, the transmission rate will be 16 Kbps when a single channel is assigned to the BPSK whereas it will be 256 Kbps when four channels are assigned to the 16QAM.

Figure 6:
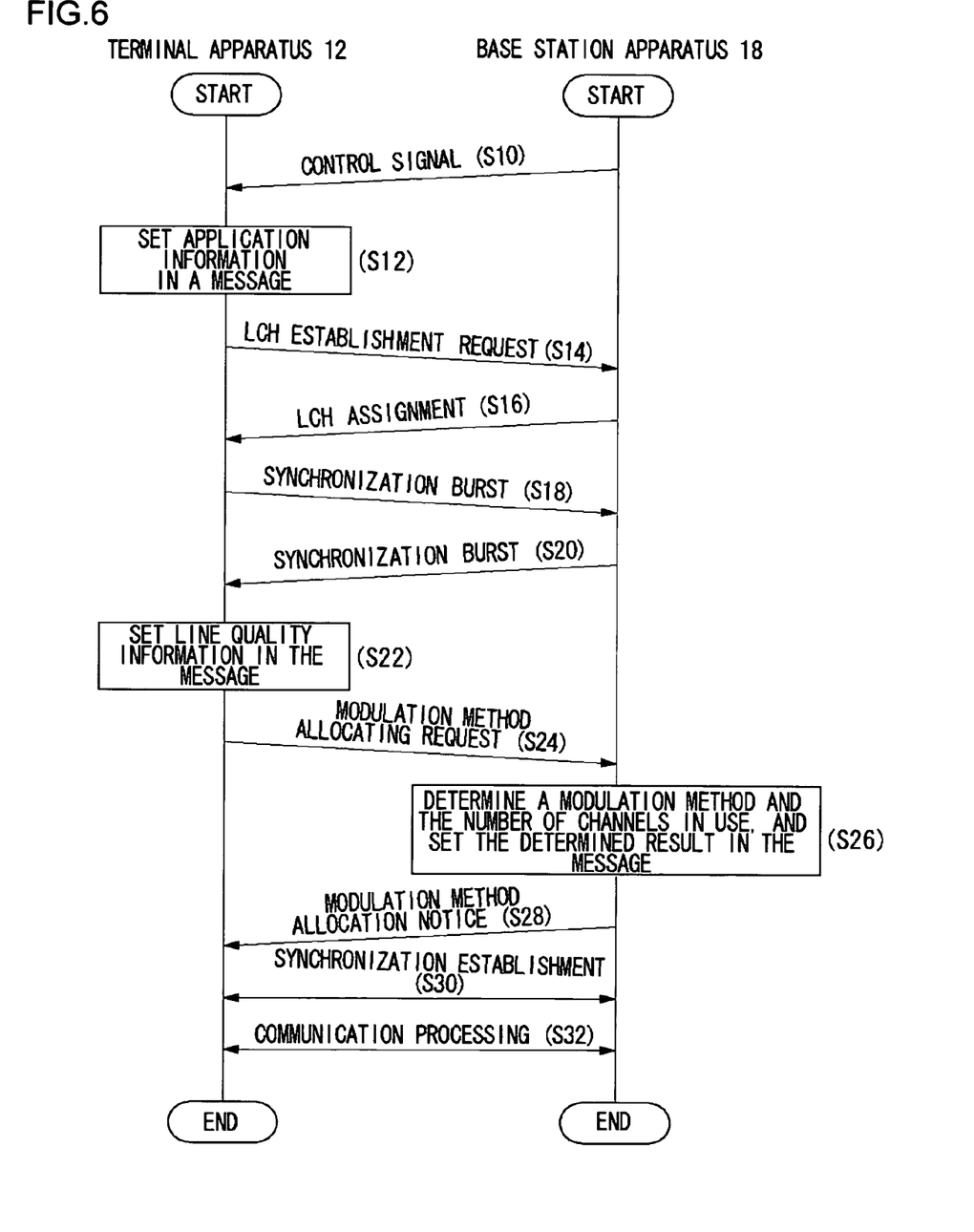
FIG. 6 is a sequence diagram showing a procedure for allocating channels in the communication system shown in FIG. 1.

FIG. 6 is a sequence diagram showing a procedure for allocating channels. The base station apparatus 18 transmits a control signal to a plurality of terminal apparatuses 12 (S10). The instruction unit 36 in the terminal apparatus 12 sets application information in a message (S12). The terminal apparatus 12 transmits to the base station apparatus 18 an LCH establishment request, namely, a request for allocation of channels for use with a communication (S14). The base station apparatus 18 notifies the terminal apparatus 12 of an LCH assignment (S16). The terminal apparatus 12 sends a synchronization burst to the base station apparatus 18 (S18), and the base station apparatus 18 sends the synchronization burst to the terminal apparatus 12 (S20). The instruction unit 36 in the terminal apparatus 12 sets the information on line quality in the message (S22). The terminal apparatus 12 transmits a modulation method allocating request to the base station apparatus 18 (S24). The base station apparatus 18 determines a modulation method and the number of channels in use by the modulation method and channels determining unit 66, and the instruction unit 64 in the base station apparatus 18 sets the thus determined result in the message (S26). The base station apparatus 18 transmits to the terminal apparatus 12 a modulation method allocation notice contained in the message (S26). After the message of synchronization establishment has been notified from the terminal apparatus 12 to the base station apparatus 18 (S30), a communication processing to use an application is performed between the terminal apparatus 12 and the base station apparatus 18 (S32).

Figure 7:
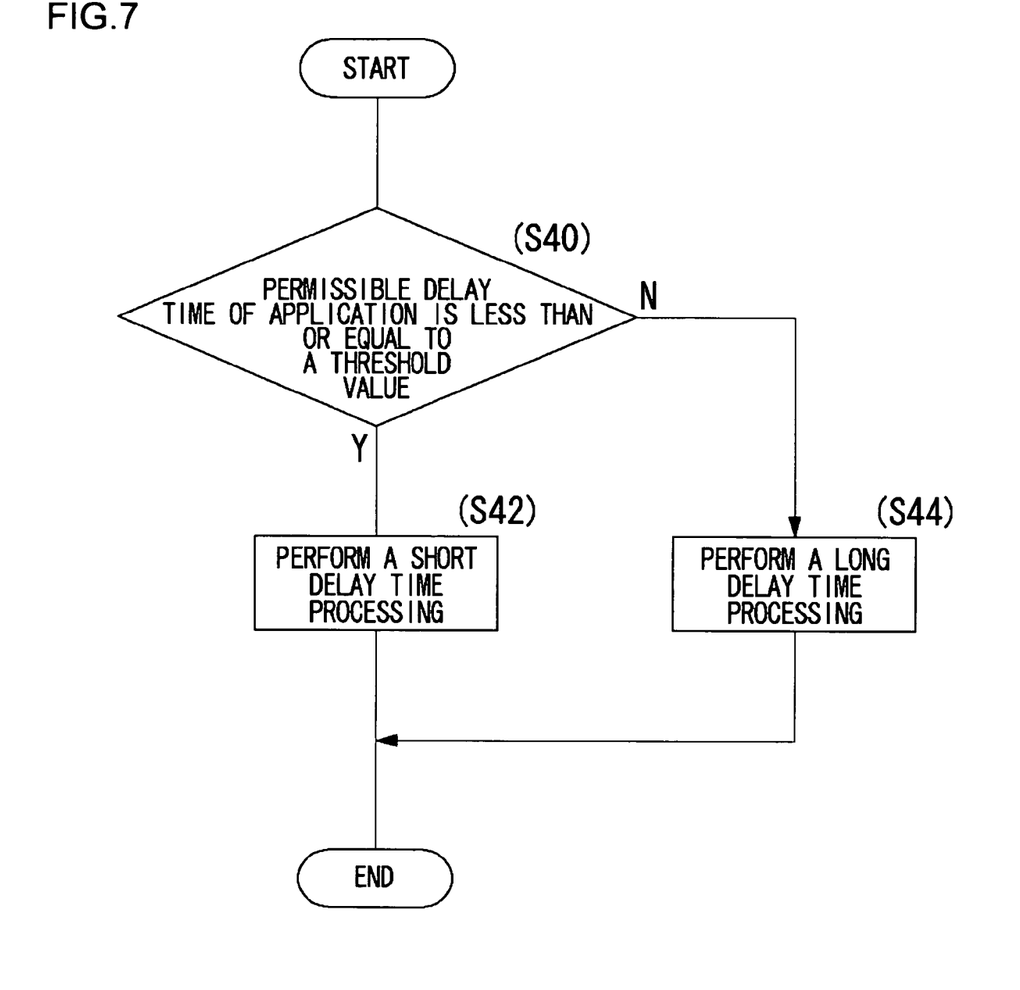
FIG. 7 is a flowchart showing a procedure for allocating channels in the base station apparatus shown in FIG. 4.

FIG. 7 is a flowchart showing a procedure for allocating channels. The modulation method and channels determining unit 66 shown in FIG. 4 compares the permissible delay time in the application information notified from the application detector 68 to a threshold value. Instead, the comparison may be made based on classification information on application in the application information. If the permissible delay time of the application is less than or equal to a threshold value (Y of S40), a processing for short delay time is performed (S42). If the permissible delay time of the application is not less than or equal to the threshold value (N of S40), a processing for long delay time is performed (S44). The details on the short delay time processing and long delay time processing will be described later.

Figure 8:
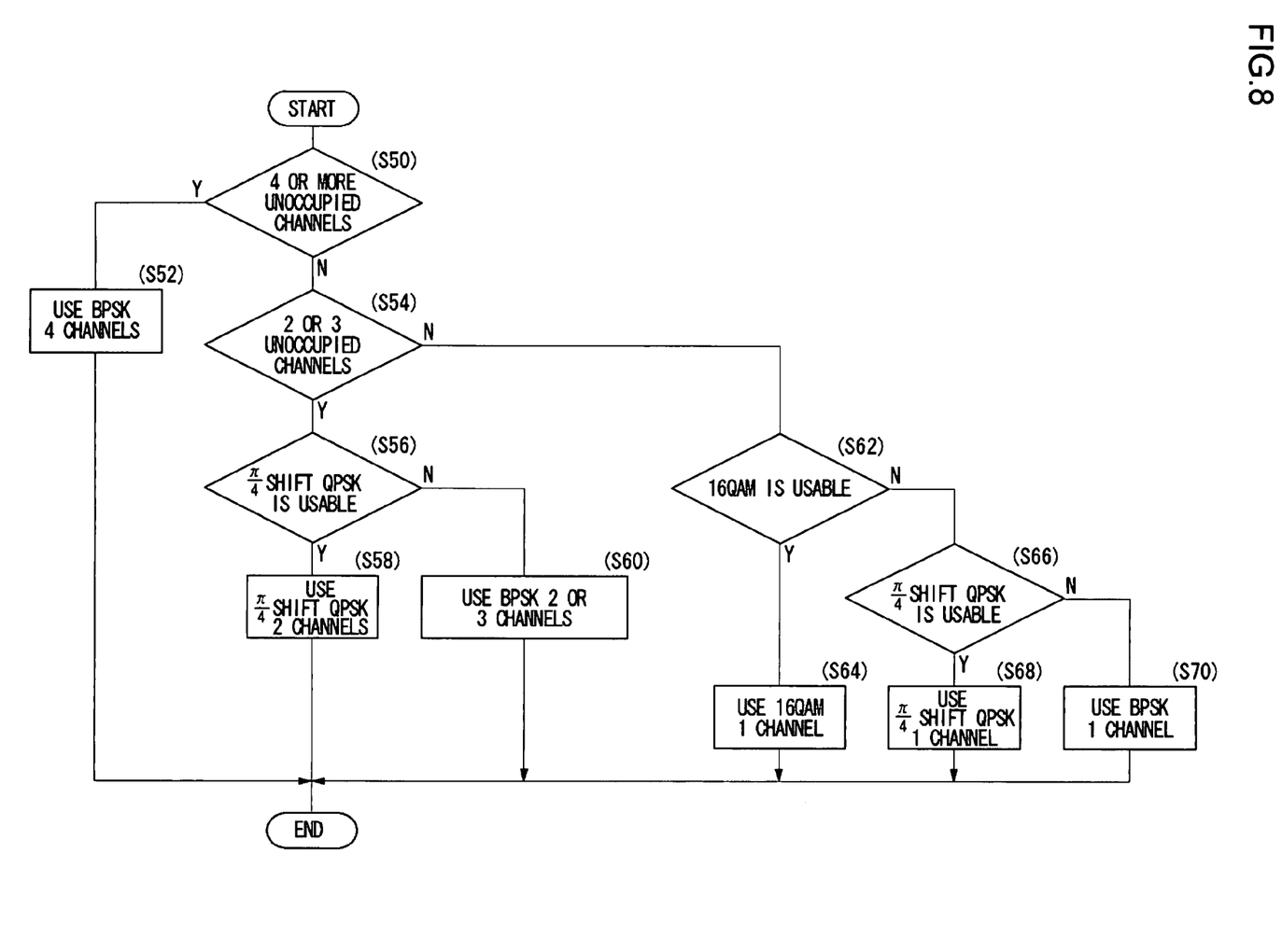
FIG. 8 is a flowchart showing a procedure for short delay time processing shown in FIG. 7.

FIG. 8 is a flowchart showing a procedure for short delay time processing. The modulation method and channels determining unit 66 shown in FIG. 4 checks on the number of unoccupied channels, based on the channel usage rate notified from the usage rate detector 70. If the number of unoccupied channels is four or more (Y of S50), the modulation method and channels determining unit 66 allocates four channels to the terminal apparatus 12, which is to be communicated with, by using BPSK as the modulation method (S52). If, on the other hand, the number of unoccupied channels is not more than four (N of S50) and it is two or three (Y of S54) and if the $\pi/4$ shift QPSK is available (Y of S56), $\pi/4$ shift QPSK is allocated to the two channels as the modulation method, based on the information on the line quality 0051]

If the $\pi/4$ shift QPSK is not available (N of S56), two or three channels are assigned with the modulation method of BPSK (S60). If, on the other hand, the number of unoccupied channels is not two or three (N of S54) and 16QAM is usable (Y of S66), one channel is assigned with the modulation method of 16QAM (S64). If 16QAM is not available (N of S62) and $\pi/4$ shift QPSK is available (Y of S66), one channel is assigned with the modulation method of $\pi/4$ shift QPSK. If 16QAM is not available (N of S62) and $\pi/4$ shift QPSK is also not available (N of S66), one channel is assigned with the modulation method of BPSK (S70).

Figure 9:
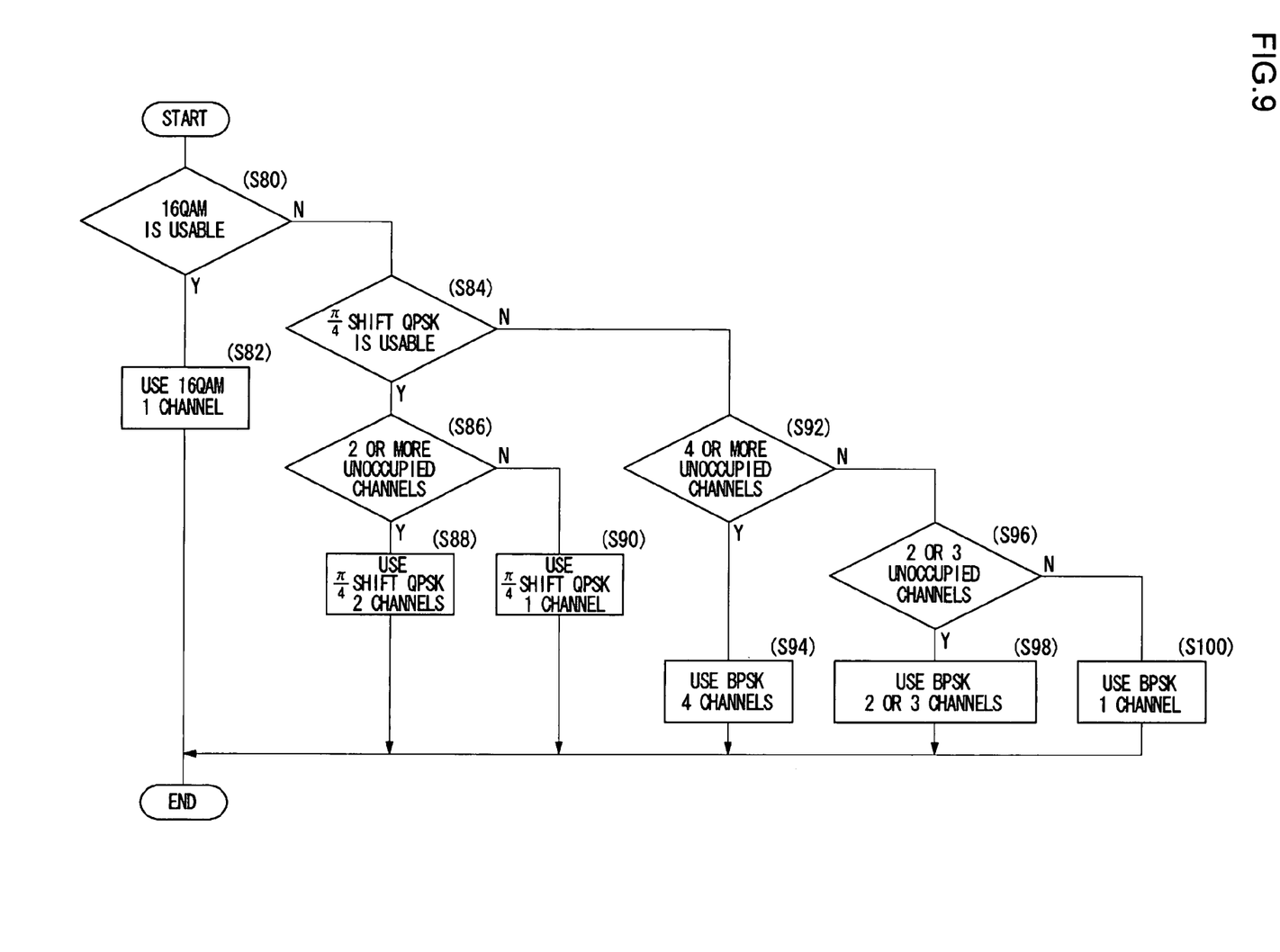
FIG. 9 is a flowchart showing a procedure for long delay time processing shown in FIG. 7.

FIG. 9 is a flowchart showing a procedure for long delay time processing. If 16QAM is available (Y of S80), the modulation method and channels determining unit 66 shown in FIG. 4 allocates, based on information on the line quality notified from the quality detector 56, one channel to the terminal apparatus 12, which is a targeted communication party, by using 16QAM as the modulation method (S82). If 16QAM is not available (N of S80) and $\pi/4$ shift QPSK is available (Y of S84), the number of unoccupied channels is examined based on the channel usage rate notified from the usage rate detector 70. As a result, if the number of unoccupied channels is two or more (Y of S86), $\pi/4$ shift QPSK is allocated to two channels as the modulation method (S88). If, however, the number of unoccupied channels is not two or more (N of S86), one channel $\pi/4$ shift QPSK is allocated (S90).

If, on the other hand, $\pi/4$ shift QPSK is not available (N of S84) and the number of unoccupied channels is four or more (Y of S92), then four channels are assigned with the modulation method of BPSK (S88). If the number of unoccupied channels is not four or more (N of S92) and it is two or three (Y of S96), then two or three channels are assigned with the modulation method of BPSK (S98). And if the number of unoccupied channels is not two or three (N of S96), one channel is assigned with the modulation method of BPSK (S100).

An operation for the communication system 100 structured as above will be described hereinbelow. In the terminal apparatus 12, the line quality based on the received signals from the base station apparatus 18 and the application information from the application software 38 are simultaneously or separately set in a message so as to be transmitted to the base station apparatus 18. In the modulation method and channels determining unit 66 in the base station apparatus 18, the allocation of the modulation method and the number of channels is determined according to the line quality, application information and channel usage rate detected. For example, if the permissible delay time is shorter than the threshold value and the number of unoccupied channels is two and the communication can be done by π/4 shift QPSK, then two channels are assigned with the modulation method of π/4 shift QPSK. Then, the instruction unit 64 notifies the terminal apparatus of this allotment result.

According to the present embodiments, the allocation of the modulation method and the number of channels is determined according to the permissible delay time that corresponds to the kind of application in question. Thus, if the permissible delay time is small, the larger number of channels is used together with a modulation method which can keep the error rate lower. Similarly, if the permissible delay time is large, the smaller number of channels is used together with a modulation method which can transmit a large amount of data. As a result thereof, the multiplexing of a plurality of terminal apparatuses can be done while satisfying the permissible delay time. The present invention has been described based on the embodiments which are only exemplary. It is understood by those skilled in the art that there exist other various modifications to the combination of each component and process described above and that such modifications are encompassed by 0057]

In the present embodiments, the communication system 100 implements TDMA (Time Division Multiple Access), but the multiple access method is not limited thereto. For example, FDMA (Frequency Division Multiple Access) or CDMA (Code Division Multiple Access) may also be used. And the present invention may be applied to wide range of embodiments. In other words, the present embodiments may be applied as long as a base station multiplexes a plurality of terminals.

In the present embodiments, a transmission rate per channel is determined by a modulation method only, and the modulation method and channels determining unit 66 determines the modulation method alone. However, the present embodiments are not limited thereto, and the coding rate in error correction may be considered, for example. In this modified example, the transmission rate can be set more finely. In other words, a factor or factors to be taken into consideration may be any term which determines and/or affects the transmission rate. For example, if three types of modulation methods and four kinds of coding rates are prepared, then the total of twelve different transmission rates will be available.

Although the present invention has been described by way of exemplary embodiments, it should be understood that many changes and substitutions may further be made by those skilled in the art without departing from the scope of the present invention which is defined by the appended claims.

What is claimed is:

1. A base station apparatus, including:
   a receiver which receives signals from a terminal apparatus which is a targeted communication party, each of the signals corresponding to one of a plurality of modulation methods;
   a permissible delay time detector which detects, from the signals received by said receiver, permissible delay time in data communication corresponding to an application used in said terminal apparatus;
   a quality detector which derives from the received signals a value indicative of the quality of a communication line;
   a decision unit which determines a modulation method to be used for data for the terminal apparatus and the number of channels per frame to be allocated to said terminal apparatus, in a communication line that contains a plurality of channels in a frame, according to the permissible delay time detected by said detector, so that the communication rate as determined by the modulation method and the number of channels approaches a predetermined value; and
   an instruction unit which instructs said terminal apparatus to perform communication of data corresponding to the application by using the modulation method and the number of channels determined by said decision unit, wherein
   if the detected permissible delay time is greater than a predetermined threshold value, said decision unit determines to use a modulation method capable of transmitting a relatively large amount of data according to the derived value indicative of the quality of a communication line, and, subsequently, to use a relatively small number of channels and
   if the detected permissible delay time is less than or equal to the predetermined threshold value, said decision unit determines to use a relatively large number of channels in accordance with the number of unoccupied channels, and, subsequently, to use a modulation method that ensures a relatively low error rate.

2. A communication system, including:
   a terminal apparatus which uses a predetermined application; and
   a base station apparatus which communicates with said terminal, apparatus via a communication line containing a plurality of channels in a frame, using one of a plurality of modulation methods,
   wherein said terminal apparatus transmits, to the base station apparatus, information on permissible delay time in data communication corresponding to the predetermined application to be used, and
   wherein said base station apparatus detects quality of the communication line and the number of unoccupied channels and determines a modulation method to be used for data for the terminal apparatus and the number of channels per frame to be allocated to said terminal apparatus, so that the communication rate as determined by the modulation method and the number of channels approaches a predetermined value, wherein
   if the detected permissible delay time is greater than a predetermined threshold value, said base station apparatus determines to use a modulation method capable of transmitting a relatively large amount of data according to the quality of a communication line, and, subsequently, to use a relatively small number of channels and
   if the detected permissible delay time is less than or equal to the predetermined threshold value, said base station apparatus determines to use a relatively large number of channels in accordance with the number of unoccupied channels, and, subsequently, to use a modulation method that ensures a relatively low error rate.

3. A channel allocating method, including:
   receiving signals from a terminal apparatus which is a targeted communication party, each of the signals corresponding to one of a plurality of modulation methods;

detecting, from the signals received by said receiving, permissible delay time in data communication corresponding to an application used in said terminal apparatus;

deriving from the received signals a value indicative of the quality of a communication line;

determining a modulation method to be used for data for the terminal apparatus and the number of channels per frame to be allocated to the terminal apparatus, in a communication line that contains a plurality of channels in a frame, according to the permissible delay time detected by said detecting, so that the communication rate as determined by the modulation method and the number of channels approaches a predetermined value; and instructing the terminal apparatus to perform communication of data corresponding to the application by using the modulation method and number of channels determined by said determining, wherein if the detected permissible delay time is greater than a predetermined threshold value, the determining step determines to use a modulation method capable of transmitting a relatively large amount of data according to the quality of a communication line, and, subsequently, to use a relatively small number of channels and if the detected permissible delay time is less than or equal to the predetermined threshold value, the determining step determines to use a relatively large number of channels in accordance with the number of unoccupied channels, and, subsequently, to use a modulation method that ensures a relatively low error rate.

4. A computer readable medium storing a program executable by a computer, the program causing the computer to perform the functions of:

receiving the signals from a terminal apparatus which is a targeted communication party, each of the signals corresponding to one of a plurality of modulation methods;

detecting, from the signals received by said receiving, permissible delay time in data communication corresponding to an application used in said terminal apparatus;

deriving from the received signals a value indicative of the quality of a communication line;

determining a modulation method to be used for data for the terminal apparatus and the number of channels per frame to be allocated to the terminal apparatus, in a communication line that contains a plurality of channels in a frame, according to the permissible delay time detected by said detecting, so that the communication rate as determined by the modulation method and the number of channels approaches a predetermined value; and instructing the terminal apparatus to perform communication of data corresponding to the application by using the modulation method and the number of channels determined by said determining, wherein if the detected permissible delay time is greater than a predetermined threshold value, the determining function determines to use a modulation method capable of transmitting a relatively large amount of data according to the quality of a communication line, and, subsequently, to use a relatively small number of channels and if the detected permissible delay time is less than or equal to the predetermined threshold value, the determining function determines to use a relatively large number of channels in accordance with the number of unoccupied channels, and, subsequently, to use a modulation method that ensures a relatively tow error rate.

5. A channel allocating method comprising:

receiving signals from a terminal apparatus which is a targeted communication party, each of the signals corresponding to one of a plurality of modulation methods;

detecting, from the signals received by said receiving, permissible delay time in data communication corresponding to an application used in said terminal apparatus;

deriving from the received signals a value indicative of the quality of a communication line;

determining a modulation method and the number of channels to be allocated to the terminal apparatus, in a communication line that contains a plurality of channels, according to the permissible delay time detected by said detecting, so that the communication rate as determined by the modulation method and the number of channels approaches a predetermined value; and instructing the terminal apparatus to perform communication of data corresponding to the application by using the modulation method and number of channels determined by said determining, wherein if the detected permissible delay time is greater than a predetermined threshold value, the determining step determines to use a modulation method capable of transmitting a relatively large amount of data according to the quality of a communication line, and, subsequently, to use a relatively small number of channels and if the detected permissible delay time is less than or equal to the predetermined threshold value, the determining step determines to use'a relatively large number of channels in accordance with the number of unoccupied channels, and, subsequently, to use a modulation method that ensures a relatively low error rate.

* * * * *